US008286852B2

(12) United States Patent
Kolbe et al.

(10) Patent No.: US 8,286,852 B2
(45) Date of Patent: Oct. 16, 2012

(54) METHOD OF FRICTION WELDING OF A PISTON HAVING A COOLING DUCT

(75) Inventors: Peter Kolbe, Aalen (DE); Ernst-Peter Schmitz, Abtsgmuend (DE)

(73) Assignee: Gesenkschmiede Schneider GmbH, Aalen (DE)

( * ) Notice: Subject to any disclaimer, the term of this patent is extended or adjusted under 35 U.S.C. 154(b) by 0 days.

(21) Appl. No.: 13/016,174

(22) Filed: Jan. 28, 2011

(65) Prior Publication Data
US 2011/0132971 A1 Jun. 9, 2011

Related U.S. Application Data

(63) Continuation-in-part of application No. 12/349,259, filed on Jan. 6, 2009, now abandoned.

(30) Foreign Application Priority Data

Feb. 29, 2008 (DE) .................. 10 2008 012 049

(51) Int. Cl.
*B23K 20/12* (2006.01)
(52) U.S. Cl. .................................. 228/112.1; 228/114
(58) Field of Classification Search ............. 228/112.1, 228/114
See application file for complete search history.

(56) References Cited

FOREIGN PATENT DOCUMENTS

| DE | 41 34 528 A1 | 5/1992 |
|----|---|---|
| DE | 10 2006-021 044 A1 | 11/2007 |
| EP | 1 061 249 A2 | 12/2000 |
| JP | 2000-301364 A | 10/2000 |
| JP | 2002-224857 A | 8/2002 |
| JP | 2003-19574 A | 1/2003 |
| JP | 2003-25076 A | 1/2003 |
| WO | 2006/034862 A1 | 4/2006 |

OTHER PUBLICATIONS

Official Translation of DE 10 2006 021 044, originally published Nov. 8, 2007.*

* cited by examiner

*Primary Examiner* — Nicholas D'Aniello
(74) *Attorney, Agent, or Firm* — Roberts Mlotkowski Safran & Cole, P.C.; David S. Safran

(57) ABSTRACT

A method of friction welding a head part to a skirt part of a piston having a hollow cooling duct in which the internal connection surface of the first part to be welded is reciprocally arranged with an internal connection surface of the second part to be friction welded, so that they form a unsymmetrical contact area, so that the resulting weld of the first and the second parts produces a weld bead that is located predominantly outside of the hollow cooling duct. The unsymmetrical contact area can be formed by chamfered, angled edge surfaces that produce, for example, a wedge-shaped space, or partially matched, inter-fitting surfaces that remain out of contact and produce a gap at sides facing the hollow space.

7 Claims, 5 Drawing Sheets

METHOD OF FRICTION WELDING OF A PISTON HAVING A COOLING DUCT

CROSS REFERENCE TO RELATED APPLICATION

This application is a continuation-in-part of commonly owned, co-pending U.S. patent application Ser. No. 12/349,259, filed Jan. 6, 2009.

BACKGROUND OF THE INVENTION

1. Field of the Invention

The present invention relates to a method for welding a piston head member with a piston skirt member of a piston with a cooling duct by friction welding, wherein the hollow space of the cooling duct preferably contains no protruding welding beads.

2. Description of Related Art

The connection between two parts of a piston having a cooling duct by friction welding is known. International Patent Application WO 2006/034862 A1 teaches a piston having a cooling duct, where the piston head is connected with the piston skirt member by friction welding the walls of the cooling duct resulting in weld beads on both sides of the weld. The aforesaid weld beads in the cooling duct negatively influence the cooling medium.

From German Patent Application DE 10 2006 01 044 A1, it is known to form concomitantly two welds with small weld beads by friction welding, whereas the beads in the cooling duct must be machined from outside leaving a smooth surface within the cooling duct.

So until now, it was necessary to use mechanical machining to obtain a smooth surface in the cooling duct of a friction welded piston with a cooling duct so that the cooling oil has an undisturbed free flow pathway in the piston to enable optimum cooling thereof.

SUMMARY OF THE INVENTION

It is a primary object of the invention to have pistons with cooling ducts with four friction weld connections produced concomitantly to save production steps. To this aim, it is very important that the internal hollow space is as free of weld beads as possible. This should allow an undisturbed oil circulation (all weld beads limiting the oil flux are disadvantageous for cooling).

According to the present invention, the problem is solved by a method of friction welding of a piston having a cooling duct, a head member and a skirt member; wherein a hollow duct is formed upon welding together of the head and skirt member; with the steps: providing a head member; providing a skirt member; wherein the surfaces to be welded are chamfered such that they do not match but provide a gap for the welding bead produced by the friction welding in the cooling channel, thus leading to essentially no weld beads protruding into the cooling channel, arranging the contact areas of the parts to be welded wherein the internal connection surface of the inner wall of the head member to be welded is reciprocally arranged with an internal connection surface of the inner wall of the skirt member to be welded by friction welding, and arranging an external connection surface of the outer wall of the first part to be welded relative to the outer wall of the second part to be welded, so that a gap being formed between the internal connection surfaces of the head and shirt member before the welding; and concomitantly producing four friction welded connections between said connection surfaces while forming friction weld beads not protruding into the cooling duct but essentially resting in the gaps adjacent the cooling duct. Preferably, the head member and skirt are made of a metal selected from the group consisting of heat treatable steel, titanium alloy and low alloy steel.

For both members to be welded do not match at their contact areas before the welding, bigger contact areas are formed only during the welding process, the formation of the weld bead on the parts to be connected can be controlled and defined in an exact way.

In order to achieve a non-holohedral contact between both members before welding, at least one of the connection surfaces of the first or the skirt member to be welded is chamfered. For the two connection surfaces to be welded are not fitting exactly one on another before the welding process they form a small contact area which during the welding process advantageously grows to a full contact area. Both the areas of the parts to be connected can be chamfered. However, it is preferred to weld by friction welding a plane area of a part with a chamfered or otherwise formed area of another part. The chamfered area can have very different profiles—also straight-lined, concave, convex, or acute, stepped etc. The shape of the chamfer depends on the alignment of the welding process and also depends on which kind of weld seam is to be achieved. If the weld seam is chamfered on one side, on the peripheral side where there is less material a smaller or no weld bead is produced. On the peripheral side where the connection surfaces to be welded contact there is more material. A respectively bigger weld bead is formed wherein its size can not be exactly predetermined. If a gap is left after welding, the weld bead may rest in the gap.

If the connection surface to be welded is chamfered on two sides, that is on two peripheries considered from the cross section, the contact area is in the middle and the size of the welding seams can be defined and controlled on both sides. Thereby the width of the weld bead can be controlled to be produced in a defined size towards the direction of the chamfered side. The majority of the material accumulation is on the side on which a contact area is formed before and during the welding process.

In order to reduce the weld bead to a certain size in certain applications and to have to use only certain chipping or turning tools, the connected parts are assembled at least on one side by friction welding with no weld bead or with a very small weld bead. Thereby a weld bead can be completely eliminated within a predetermined width size.

In order to achieve a uniform expansion when the friction welded part is heated and a long life cycle and good insertion characteristics, the material of the first and the skirt member are identical.

To ameliorate the quality of the friction welded parts while implementing other requirements, and at the same time to produce a very economical friction welded part, it can be an advantage if the material of the head and the skirt member are different for what concerns the alloy. For example a finished or a high strength alloy in the upper part and for the skirt member an inferior/softer or less expensive material can be used. Typically the head part is made of engine valve steel, heat treatable steel, Titanium whereas the skirt part is made of low alloy steel, heat treatable steel, titanium. It shall be understood that the material alloys comprise steel and/or aluminum alloys or titanium alloys or a combination between steel and aluminum alloy or titanium alloy.

With a friction welded piston for a combustion engine it is preferred that it is produced according to one of the methods described above, wherein the head member to be connected is a piston top and the skirt member to be connected is a piston ring.

It shall be understood that the above mentioned characteristics to be explained in the following, cannot be used only in the respectively indicated combination only, but also in other combinations.

In the following the invention is explained in detail on basis of a piston by referring to the annexed figures the present invention is not limited to. They show what follows:

DETAILED DESCRIPTION OF THE INVENTION

Figure 1:
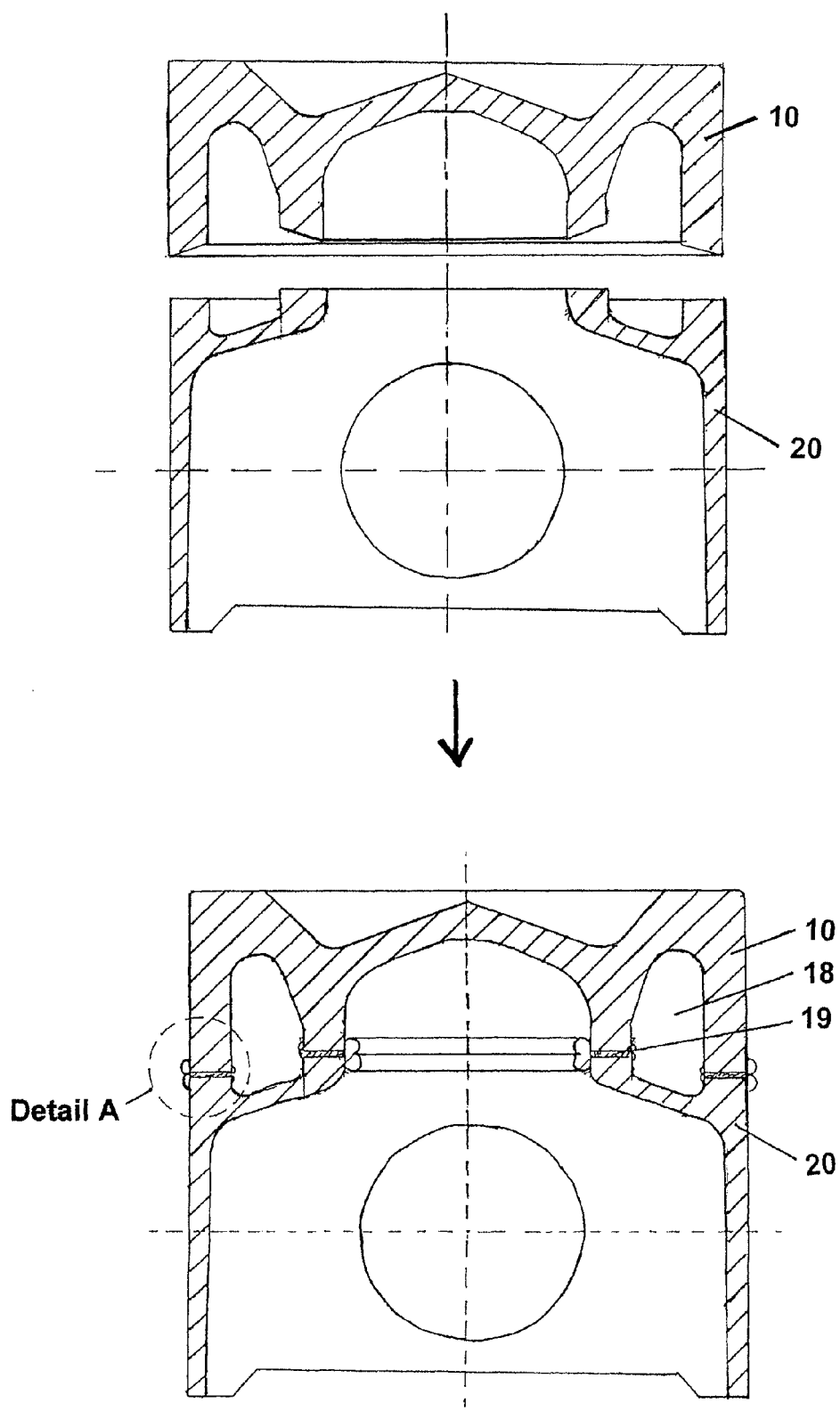
FIG. 1 shows on the upper side a detail of a cross section of two piston members to be connected with the method of the present invention and on the lower side the connected piston members.

FIG. 1 shows schematically a cross section of a piston head 10 and of a piston skirt 20 one over the other before welding. The chamfer of the walls to be welded is clear, so that the material accumulation during the friction welding process is formed outside of the oil duct 18. The head of the piston 10 according to this embodiment shows the special design of an external chamfered welding surface 13b on the head member 10, as displayed in detail in FIG. 2. The aforesaid chamfered welding surface 13b is put on a plane welding surface of the skirt of the piston 20 during the connection with the skirt of the piston 20 by friction welding. The result is that on the right side of the FIG. 2 there is less material than on the left side of FIG. 2. So there is a cuneiform gap 14 before the friction welding. As a consequence, the contact areas of the under and upper part 20, 21 to be welded are only incompletely in form fit. The holohedral connection is only the result of a friction welding process. The cuneiform gap can be designed in an angle of approximately 4-15°, preferably of approximately 5-10°, and most preferably of 7,5°.

Figure 2:
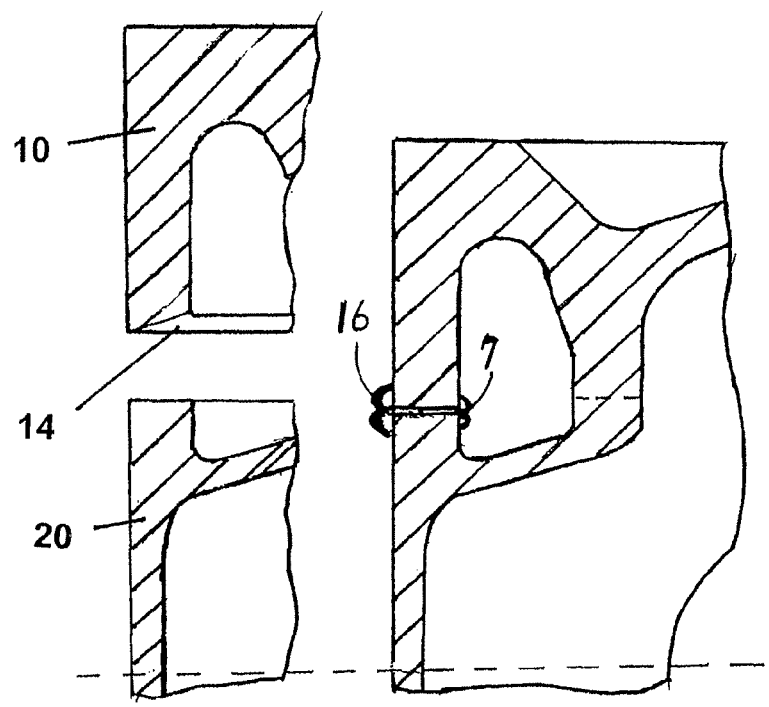
FIG. 2 shows a part of the cross section of FIG. 1 with formation of weld beads.

FIG. 2 shows as particular detail section A of FIG. 1. FIG. 2 shows that a weld bead 16 is designed in a traditional way on the external part of the piston. In contrast, the friction weld bead 7 on the internal side has a substantially smaller size. In this way, according to this embodiment a good cooling oil flux inside the oil duct is guaranteed without mechanical machining.

Figure 3:
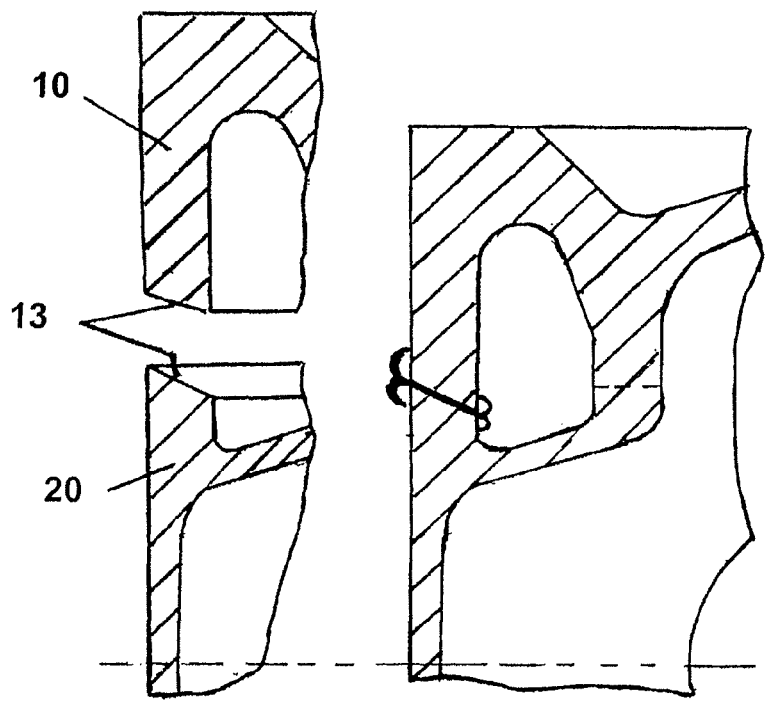
FIG. 3 shows a section of a second embodiment of an external wall of the piston before and after friction welding.

FIG. 3 shows a section of a second embodiment of an external wall of a piston before and after the friction welding process, wherein in this case the external wall of the piston is designed so that both the surfaces to be welded are arranged in an angle one to the other so that the material accumulation is formed on the external side of the piston.

Figure 4:
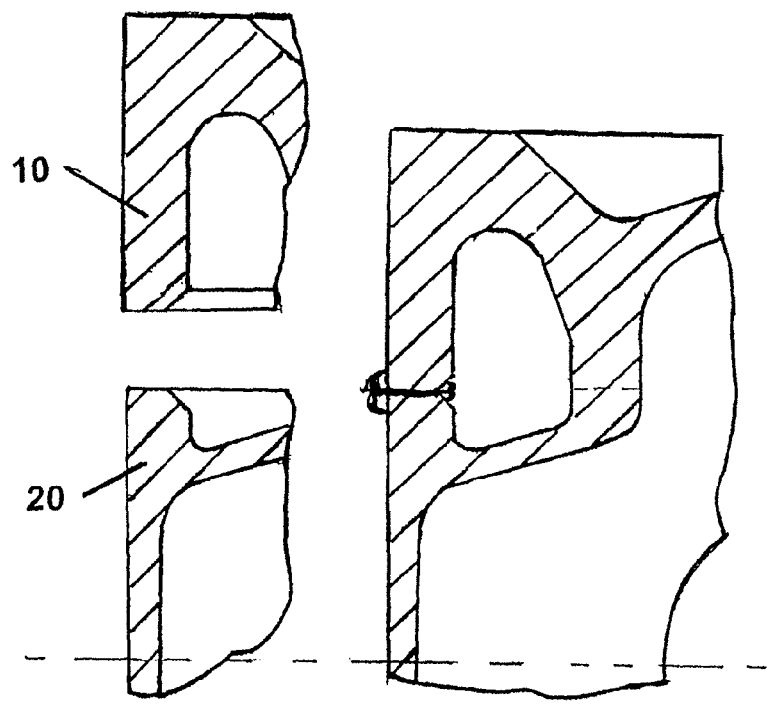
FIG. 4 shows a section of a third embodiment of an external wall of the piston before and after friction welding.

FIG. 4 shows a section of a third embodiment of an external wall of a piston before and after the friction welding process, wherein in this case there is an opening in the area of the oil duct inside the piston walls, in which the material of the weld bead can be accumulated after that, without limiting the internal width of the oil duct.

Figure 5:
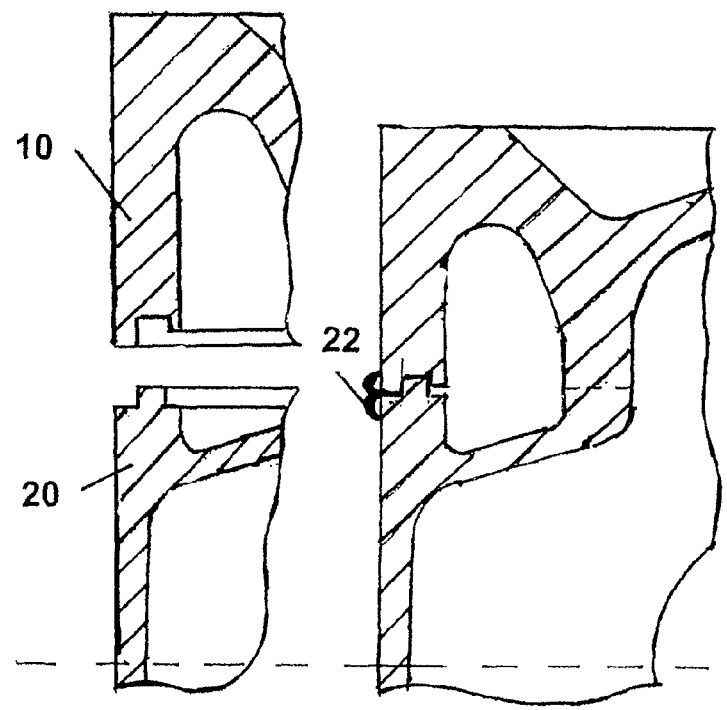
FIG. 5 shows a section of a fourth embodiment of an external wall of the piston before and after the friction welding.

FIG. 5 shows a section of a fourth embodiment of the walls of an head and shirt part of the piston made of near-fit profiles before and after the friction welding process, wherein in the area of the oil duct there is substantially less material accumulation.

Figure 6:
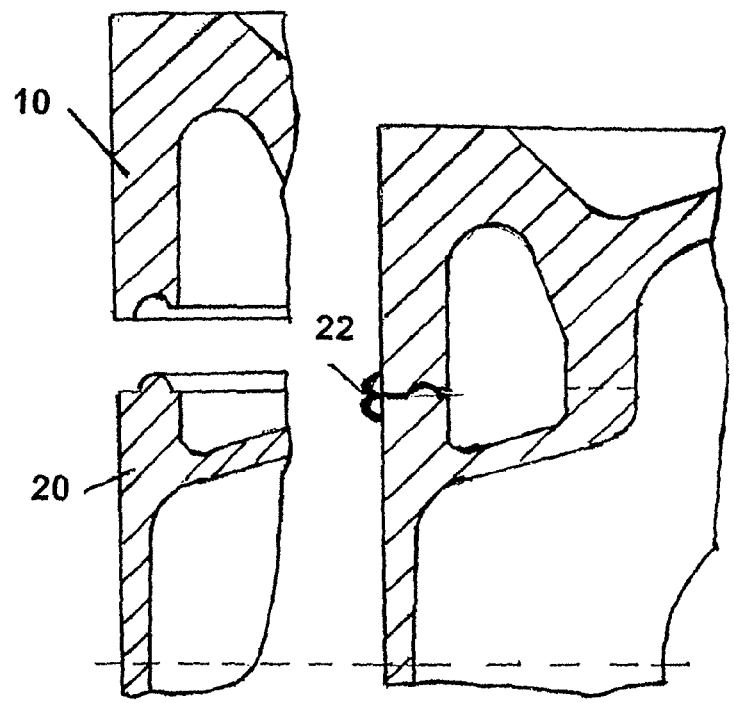
FIG. 6 shows a section of a fifth embodiment of an external wall of the piston before and after the friction welding.

FIG. 6 shows a similar formation of fitting rounded profiles of a fifth embodiment of an external wall of a piston before and after friction welding.

Figure 7:
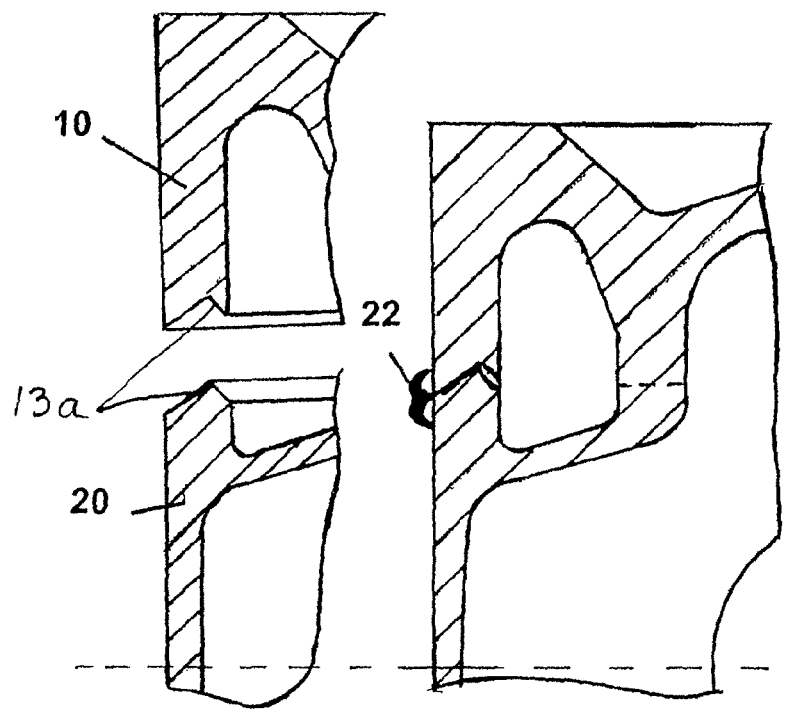
FIG. 7 shows a section of a sixth embodiment of an external wall of the piston before and after the friction welding.
Figure 8:
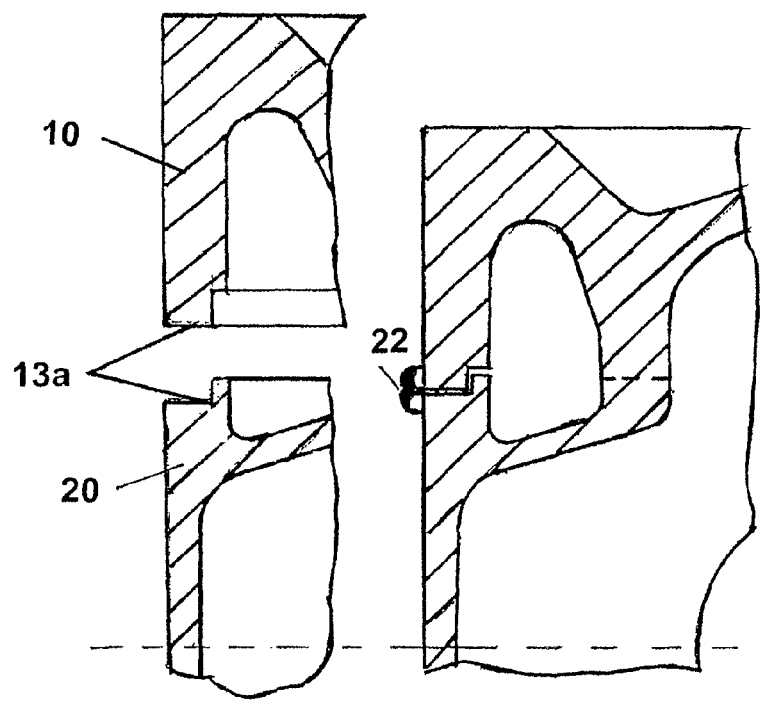
FIG. 8 shows a section of a seventh embodiment of an external wall of the piston before and after the friction welding.
Figure 9:
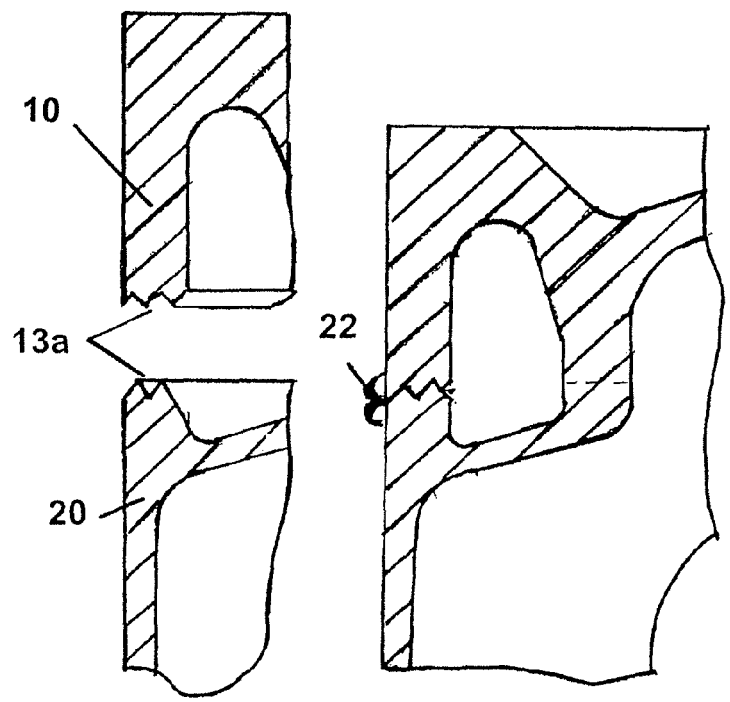
FIG. 9 shows a section of an eight embodiment of an external wall of the piston before and after the friction welding.

FIGS. 7, 8 and 9 display other sections of other embodiments of head and shirt parts of a piston before and after friction welding which are equipped with different profiles suitable for friction welding wherein in this case the material accumulations of the welding process are always formed on the external wall of the piston.

Consequently, the cooling duct 18 has no trouble volume and the friction weld bead 19, 22 can be easily checked externally by the gap 14. As a consequence, components which are faultily friction welded can be determined very quickly.

On basis of the requirements, the material the head part 10 is produced from e.g. high strength or resistant material, like for example steel, aluminum or titanium or alloys thereof. On the contrary the skirt member 20 can be made from a more flexible or inferior material, like for example micro-alloyed steel or aluminum. For the rest, we refer to the figures depicting the invention as essential parts of thereof.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of friction welding of a piston having a cooling duct, a head member and a skirt member; wherein a hollow cooling duct is formed upon welding together of the head and skirt member; with the steps:

providing a head member;

providing a skirt member;

chamfering at least one of the surfaces of contact areas of the parts of the head member and skirt member to be welded such that they do not match and provide a gap for receiving a welding bead produced by the friction welding when the parts are positioned opposite each other, said gap side facing into an area for forming the cooling duct, arranging the contact areas of the parts of the head member and skirt member to be welded so that an internal connection surface of the inner wall of the head member is reciprocally arranged with respect to an internal connection surface of an inner wall of the skirt member, and arranging an external connection surface of an outer wall of the head member relative to an outer wall of the skirt member so that said gap is formed between the internal connection surfaces of the head and skirt member before welding; and then, producing friction welded connections between said internal and external connection surfaces in a manner causing friction weld beads formed to be essentially contained within in the gap adjacent the cooling duct with essentially no weld beads protruding into the cooling duct so as to allow an undisturbed oil circulation through the cooling duct by causing the material accumulations of the welding process to form outside of the cooling duct.

2. Method according to claim 1, wherein at least one of the connection surfaces of the head and skirt member to be welded one of a right-angled, concave, convex, acute, and profiled shape.

3. Method according to claim 1, wherein the material of the head member and the skirt member is the same.

4. Method according to claim 1, wherein said chamfering is performed on the surfaces of the contact areas of the parts of both of the head member and skirt member.

5. Method according to claim 1, wherein the gap formed is wedge-shaped with an angle of approx. 4°-15° opening into the cooling duct of the welded piston with the cooling duct being located between the internal and external connection surfaces of the head and skirt, so that, prior to welding, there is less material on the side of the inner walls facing the cooling duct than on the opposite side thereof.

6. Method according to claim 1, wherein the gap formed is wedge-shaped with an angle of approx. 5°-10° opening into the cooling duct of the welded piston with the cooling duct being located between the internal and external connection surfaces of the head and skirt, so that, prior to welding, there is less material on the side of the inner walls facing the cooling duct than on the opposite side thereof.

7. Method according to claim 1, wherein the skirt member provided is made of a metal selected from the group consisting of heat treatable steel, titanium alloy and low alloy steel, and wherein the head member provided is made of a metal selected from the group consisting of valve steel, titanium alloy and heat treatable steel.

* * * * *